(12) United States Patent
Clay

(10) Patent No.: US 8,456,574 B2
(45) Date of Patent: Jun. 4, 2013

(54) RECOVERY OF SERVICE MODE DATA CORRUPTION

(75) Inventor: William Clay, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 952 days.

(21) Appl. No.: 12/044,294

(22) Filed: Mar. 7, 2008

(65) Prior Publication Data

US 2009/0225168 A1 Sep. 10, 2009

(51) Int. Cl.
*H04N 5/445* (2011.01)
*H04N 7/173* (2011.01)
*H04N 7/16* (2011.01)

(52) U.S. Cl.
USPC ............................ 348/567; 725/134; 725/142

(58) Field of Classification Search
USPC ................. 725/131, 132, 134, 139, 140, 142, 725/151, 152; 348/177–178; 713/1; 711/162
See application file for complete search history.

(56) References Cited

U.S. PATENT DOCUMENTS

| 6,259,442 | B1 * | 7/2001 | Britt et al. ..................... | 715/721 |
| 7,975,304 | B2 * | 7/2011 | Lu .................................. | 726/24 |
| 2002/0166067 | A1 * | 11/2002 | Pritchard et al. .............. | 713/201 |
| 2004/0218034 | A1 * | 11/2004 | Wang et al. ................... | 348/14.1 |
| 2006/0059327 | A1 * | 3/2006 | Brown et al. .................. | 713/1 |
| 2007/0283114 | A1 * | 12/2007 | Lawrence ...................... | 711/163 |
| 2008/0010663 | A1 * | 1/2008 | Wang et al. ................... | 725/133 |

FOREIGN PATENT DOCUMENTS

JP 05199429 A2 8/1993

OTHER PUBLICATIONS

Folsom Research, "PresentationPRO—Audio and Video Seamless Switcher: Installation and Operator's Manual", Manual #26-0006901-00/Revision E, Jun. 20, 2002.
Teletronics International Inc., TT5800X/TT2400X Gateway User Manual, 2006.
Altera, "Stratix GX Device Handbook, vol. 1: 5. Configuration and Testing", pp. 5-1 to 5-10, Feb. 2005.
Phoenix Technologies, "User's Guide: Phoenix cME Console: Phoenix FirstWare Recover Version 2.3", Aug. 8, 2003.
Intel, "Intel® Express 8100 Series Routers—Router Setup and Configuration Management using Intel DeviceView for Windows", available at http://www.intel.com/support/express/routers/8xxx/sb/cs-014023.htm, created Jul. 28, 2004, last modified Aug. 4, 2004.

* cited by examiner

*Primary Examiner* — Chris Parry
*Assistant Examiner* — Sumaiya A Chowdhury
(74) *Attorney, Agent, or Firm* — Sony Corporation

(57) ABSTRACT

Service mode data is stored in a television chassis or set by duplicating all the data that is accessible by service mode, i.e. by storing the same data twice, in two separate areas of a single memory device or two separate memory devices. A "working memory" is always accessible by the chassis. A "reserved memory" is normally not accessible by the chassis. At the factory, the same service mode data is input to both the working memory and the reserved memory. The chassis microprocessor would normally only access the working memory. If any data in the working memory is changed (intentionally or not), the original factory data can be recovered from the reserved memory and copied to the working memory by executing a specific access operation.

16 Claims, 3 Drawing Sheets

RECOVERY OF SERVICE MODE DATA CORRUPTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to television sets, and more particularly to the storage of factory service mode data in the chassis.

2. Description of Related Art

A modern television set is a complex device in which the electronic components, circuitry and display device are mounted in a support structure or chassis. There are many different models with many different features. Each type of set has a package of service mode data that is installed at the factory and used to adjust the set to its proper operating parameters at the initial set up and at later times when readjustments are needed. The initial set up or later readjustments are often done by a trained service technician, but may be done by the owner or others in some cases. The correct service mode data package is necessary for the set to work properly.

Originally service mode data was confidential information only available to service people. Today, in the internet age, almost anyone can obtain this data from the Web. Through internet instructions, service mode data is often readily available to customers. However, it is possible for customers, service techs, and others to manipulate data in the service mode, which could affect the performance of the set.

If the service mode data stored in the set changes from the original factory installed data, then it may be impossible to correctly adjust the set. This may occur in at least two ways. Customers who try to perform some adjustments to their sets (color, hue, white balance, etc.), but do not perform it correctly, may alter the service mode data. Also data corruption may occur over time. Once the data has been altered, it is unlikely to be recoverable from the chassis itself, and it may be difficult to obtain from an external source. At the factory, the correct data package is installed in each set during manufacture. Later it may be difficult to obtain the right data package from the factory or other external sources, particularly for an older set or because of misidentification of the model.

Accordingly it is desirable to provide an improved method and apparatus for storing service mode data in a television set or chassis so that original factory installed data will always be available if needed to adjust the set.

BRIEF SUMMARY OF THE INVENTION

The invention is method and apparatus for storing service mode data in a television chassis or set by duplicating all the data that is accessible by service mode, i.e. by storing the same data twice. The non-volatile memory used for service data storage is configured in two separate memory areas or banks, either in a single memory device, or in two separate memory devices. One is a "working memory" which is always accessible by the chassis. The other is a "reserved memory" which is normally not accessible by the chassis. When the set is assembled at the factory, the production computers would write the same service mode data to both the working and the reserved areas of the memory. The chassis microprocessor would normally only access the working memory. If any data in the working memory is changed (intentionally or not), the original factory data can be recovered from the reserved memory and copied to the working memory.

An aspect of the invention is an apparatus for storing and retrieving original factory service mode data in a television set, made up of a working memory initially containing the original factory service mode data that is normally accessible by a user and may become corrupted; and a reserved memory containing the same original factory service mode data that is normally not accessible to a user and is only accessible on a read only basis upon execution of a specific access operation so that the data may be copied to the working memory to restore the working memory to its initial condition. A set microprocessor normally communicates only with the working memory. A user actuated control system communicates with the microprocessor to actuate the microprocessor to perform the specific access operation to access the reserved memory and copy the original factory service mode data to the working memory.

Another aspect of the invention is an improvement in a television set having a set microprocessor and a non-volatile memory connected to the microprocessor and containing service mode data, in which the non-volatile memory is formed of a non-volatile working memory initially containing the original factory service mode data that is normally accessible by a user and may become corrupted; and a non-volatile reserved memory containing the same original factory service mode data that is normally not accessible to a user and is only accessible on a read only basis upon execution of a specific access operation so that the data may be copied to the working memory to restore the working memory to its initial condition.

A further aspect of the invention is a method for storing and retrieving original factory service mode data in a television set by providing in the set a working memory that is always accessible to a user and a reserved memory that is normally not accessible to a user; and initially inputting the original factory service mode data into both the working memory and the reserved memory. Access is allowed only to the working memory during normal operation of the set, whereby the data may become corrupted. Special access is allowed, on a read only basis, to the reserved memory upon execution of a specific access operation so that the data may be copied to the working memory to restore the working memory to its initial condition.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the method and apparatus generally shown in FIG. 2 through FIG. 7. It will be appreciated that the apparatus may vary as to configuration and as to details of the parts, and the method may vary as to its particular implementation, without departing from the basic concepts as disclosed herein.

The invention is directed towards the effective storage of original factory service mode data in the chassis of a television set so that the original data will always be available. Two copies of the data are stored in a dual or redundant manner in separate memory areas. One copy is in a working memory that is normally accessible to the user and may become altered with use. The other copy is in a reserved memory that is normally not accessible and will not become altered. Special procedures allow read only access to the reserved memory to copy the data if the data in the working memory becomes altered.

Figure 1:
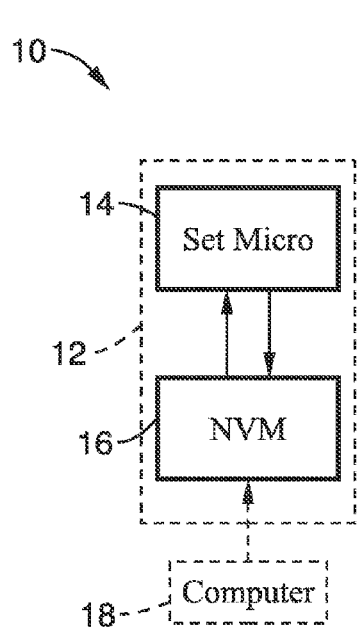
FIG. 1 is a simple block diagram of a prior art television chassis service mode data storage system.

FIG. 1 illustrates a prior art television set 10 having a chassis 12 that includes a set microprocessor 14 and a non-volatile memory 16 connected to microprocessor 14. Memory 16 is typically 32K, but may be any suitable size. Memory 16 may be a separate memory device or may be part of a larger memory contained in set 10. At the factory, a production computer 18 inputs the original service mode data into memory 16. During set up and later adjustment of television set 10 in service mode, the microprocessor 14 communicates with memory 16 and obtains the necessary data for properly configuring the set. However, if during this process, data in memory 16 is changed or lost, the memory 16 will no longer contain the original factory data, and any future adjustments of the set may not be effective. The only way to get the original data back is to obtain it from an external source and reinstall it into memory 16.

Figure 2:
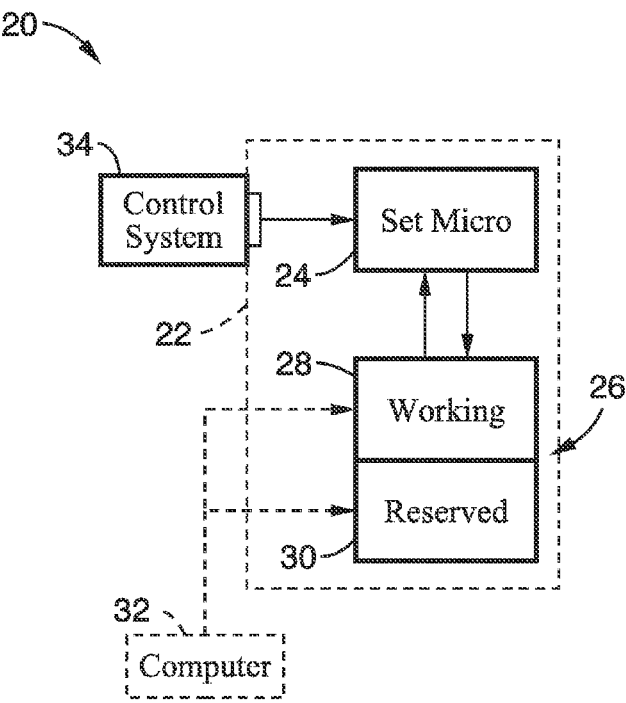
FIG. 2 is a simple block diagram of a dual memory television chassis service mode data storage system of the invention.

FIG. 2 illustrates a television set 20 according to the invention, having a chassis 22 that includes a set microprocessor 24 and a non-volatile memory 26 connected to microprocessor 24. The configuration is basically the same as set 10 of FIG. 1, but memory 26 is generally larger than memory 16, and is partitioned into two separate sections or areas, working memory 28 and reserved memory 30. Memory 26 is typically 64K, with 32K for working memory 28 and 32K for reserved memory 30, but may be any suitable size. At the factory, a production computer 32 inputs the original service mode data into both sections or areas of memory 26, i.e. into working memory 28 and reserved memory 30. Thus, initially both working memory 28 and reserved memory 30 contain the original factory service mode data.

During set up and later adjustment of television set 20 in service mode, microprocessor 24 communicates only with working memory 28 of memory 26 and obtains the necessary data for properly configuring the set. However, if during this process, data in working memory 28 is changed or lost, the working memory 28 will no longer contain the original factory data, and any future adjustments of the set may not be effective. However, the set 20 still contains the original data in reserved memory 30, although this data is not normally accessible. Set 20 also includes a control system or other means 34 that is actuated by the user to allow microprocessor 24 to access the original factory data in reserved memory 30, on a read only basis, and copy this data into working memory 28. Working memory 28 is thus restored to its original state by replacing the corrupted data with the original data. Further access to working memory 28 by microprocessor 24 will utilize the correct data.

Figure 3:
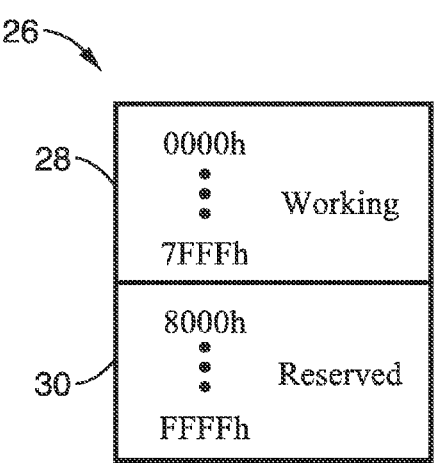
FIG. 3 is an illustrative memory allocation diagram of the invention.

FIG. 3 is an illustrative memory allocation diagram for the non-volatile memory (NVM) 26 of set 20 of FIG. 2. A 64K memory 26 is partitioned into two 32K areas, working memory 28 and reserved memory 30. Working memory 28 includes the addresses 0000h to 7FFFh and reserved memory 30 includes addresses 8000h to FFFFh. The microprocessor 24 is programmed to normally access only the addresses of working memory 28. Only when control system or other means 34 is actuated will microprocessor 24 be enabled to access the addresses of reserved memory 30, and then only to read and copy the data. The extra memory space may easily be provided. In some cases higher capacity NVM is cheaper than smaller devices. Also in some cases the required memory may be part of an even larger memory that is also used for other purposes.

Figure 4:
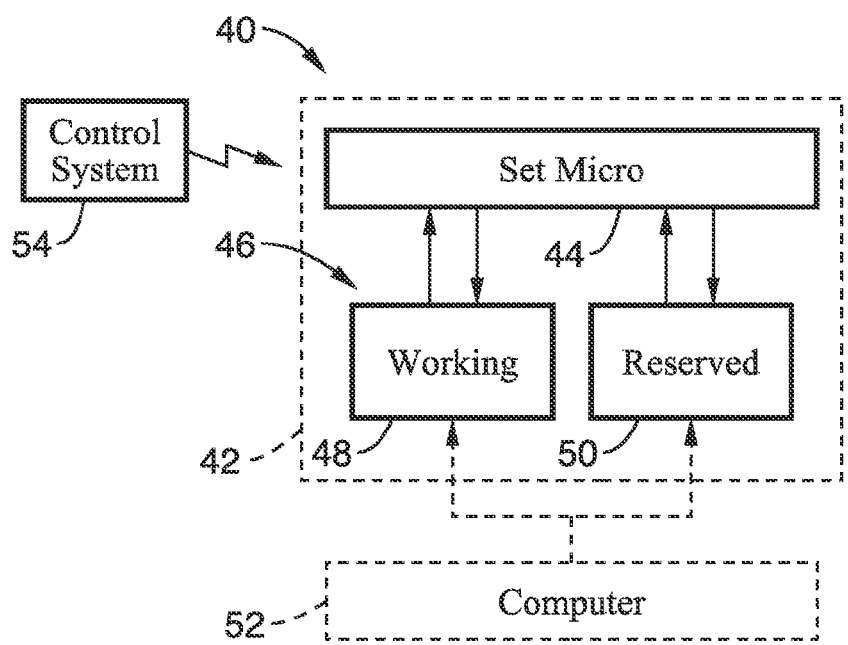
FIG. 4 is a simple block diagram of an alternate dual memory television chassis service mode data storage system of the invention.

FIG. 4 illustrates a television set 40 according to the invention, having a chassis 42 that includes a set microprocessor 44 and a non-volatile memory 46 connected to microprocessor 44. The configuration is basically the same as set 20 of FIG. 2, but memory 46 is formed of two separate memory devices, working memory 48 and reserved memory 50, instead of partitioning a single memory device into two separate areas. Memory 46 is typically 64K, with 32K for working memory 48 and 32K for reserved memory 50, but may be any suitable size. At the factory, a production computer 52 inputs the original service mode data into both devices of memory 46, i.e. into working memory 48 and reserved memory 50. Thus, initially both working memory 48 and reserved memory 50 contain the original factory service mode data.

The operation of set 40 is similar to set 20. During set up and later adjustment of television set 40 in service mode, the microprocessor 44 communicates only with working memory 48 of memory 46 and obtains the necessary data for properly configuring the set. However, if during this process, data in working memory 48 is changed or lost, the working memory 48 will no longer contain the original factory data, and any future adjustments of the set may not be effective. However, the set 40 still contains the original data in reserved memory 50, although this data is not normally accessible. Set 40 also includes a control system or other means 54 that is actuated by the user to allow microprocessor 44 to access the original factory data in reserved memory 50, on a read only basis, and copy this data into working memory 48. Working memory 48 is thus restored to its original state by replacing the corrupted data with the original data. Further access to working memory 48 by microprocessor 44 will utilize the correct data.

The control systems 34, 54 in FIGS. 2, 4 are representative of any means that can be used to actuate the microprocessor to access the normally inaccessible reserved memory. The actuator for the control system may be located on the set itself, e.g. system 34 in FIG. 2, or it may be located in a remote unit, e.g. system 54 in FIG. 4. The control system may use already existing features of the set in a particular combination to provide the necessary control signal to the microprocessor, i.e. pressing certain buttons or keys on the set or remote. For example, holding down "CH+" and "VOL−" and "Menu" for 5 sec. may effect the copying of reserved memory into working memory. The process of copying the data from reserved to working memory can be repeated as necessary, i.e. whenever sufficient corruption of the data in the working memory has been detected.

Figure 5:
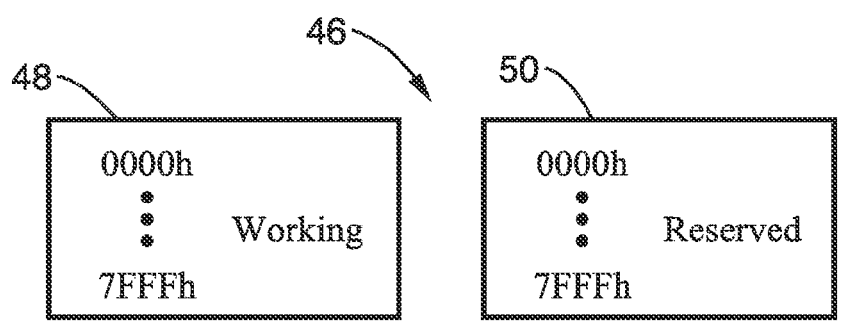
FIG. 5 is an alternate illustrative memory allocation diagram of the invention.

FIG. 5 is an illustrative memory allocation diagram for the non-volatile memory (NVM) 46 of set 40 of FIG. 4. A 64K memory 46 is made up of two separate 32K devices, working memory 28 and reserved memory 30. Working memory 48 includes the addresses 0000h to 7FFFh and reserved memory 50 includes addresses 0000h to 7FFFh. The microprocessor 44 is programmed to normally access only the addresses of working memory 48. Only when control system or other means 54 is actuated will microprocessor 44 be enabled to access the addresses of reserved memory 50, and then only to read and copy the data.

Figure 6:
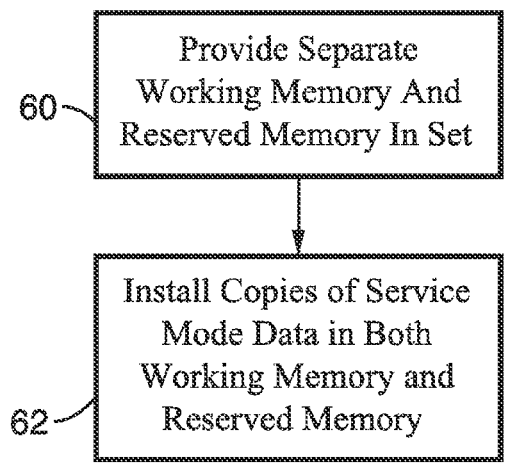
FIG. 6 is a flow chart of a method of storing service mode data in a television chassis according to the invention.

FIG. 6 is a flow chart of a method of storing service mode data in a television chassis according to the invention. First, the set is provided with separate working memory and reserved memory, step 60. This may be done by partitioning a single memory device, or a portion of a larger memory device, into two separately accessible regions. Alternately, this may be done by providing two separate memory devices. The working memory will be normally accessible during operation of the set. The reserved memory will only be accessible upon execution of a particular procedure. The service mode data is then installed in each of the working and reserved memory, step 62. Thus the set will contain two copies of the data, one normally accessible and the other only accessible in special circumstances.

Figure 7:
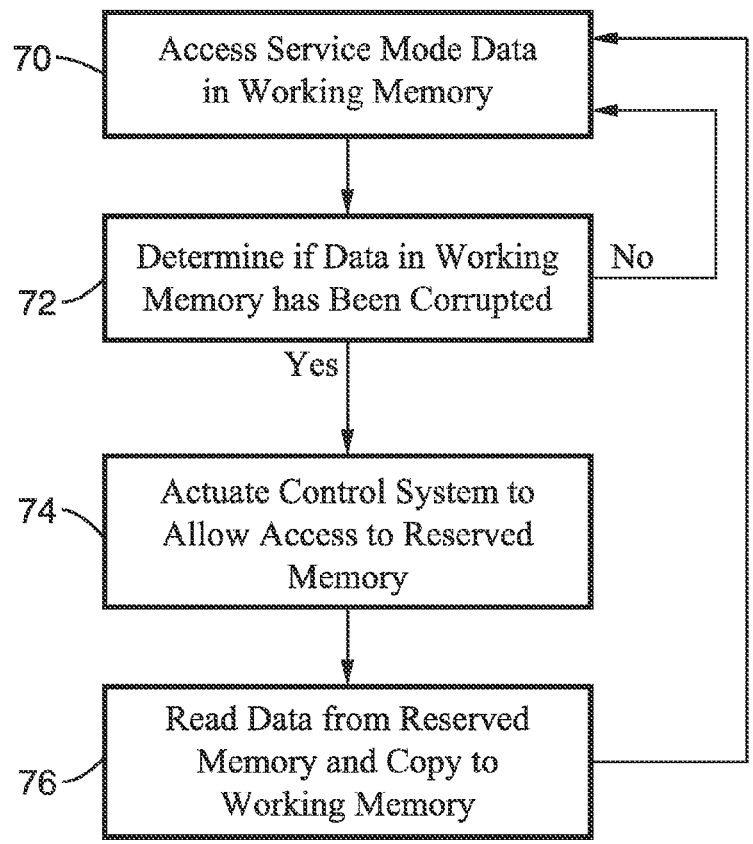
FIG. 7 is a flow chart of a method of retrieving service mode data from a television chassis according to the invention.

FIG. 7 is a flow chart of a method of retrieving service mode data from a television chassis according to the invention. The set normally accesses service mode data in the working memory, step 70. A determination is made as to whether the service mode data in working memory has become corrupted, step 72. If not, the set continues to use the data from working memory, i.e. return to step 70. If yes, then the control system to allow access to reserved memory is actuated, step 74. Data is then read out of reserved memory and copied into working memory, step 76. The set then uses data from working memory as before, i.e. returns to step 70. However, the original data has now been recaptured or recovered in working memory so it is the correct data again.

The invention thus provides a method and apparatus for storing and retrieving service mode data in a television set. By maintaining a second copy of the data in the set itself, in a configuration where it is not normally accessible, the set can be quickly brought back to original factory shipping condition, even by the consumer. Thus any changes made in the set's data in the working memory can be recovered without field adjustment, without data retrieval from the factory, and without a service tech.

Restoration of the television set to its factory settings is thus easily accomplished by recovering the factory settings from a reserved portion of the television set's memory. By creating a dual memory space for storing the factory settings in the set, one of which is a workable memory, the other of which is a limited access memory, the factory setting can be installed in both during manufacturing. Different access protocols are applied to the two memory spaces. The workable memory is accessible by all users, who can manipulate the setting information. The limited access portion is a reserved portion for the factory settings information and can only be accessed by a specific access operation. If the settings information in the workable memory gets corrupted due to user manipulations, then the factory settings stored in the limited access memory are copied to the workable memory by a simple operation to restore the set to its original factory settings.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An apparatus for storing and retrieving original factory service mode data in a television set, comprising:
    (a) a working memory operably coupled to a set microprocessor and initially containing the original factory service mode data that is normally accessible by the television set;
    (b) a reserved memory containing the same original factory service mode data that is normally not accessible to a user and is only accessible by the set microprocessor on a read only basis upon execution of a specific access operation so that the original factory service mode data is copied to the working memory to restore the working memory to an initial condition;
    (c) the set microprocessor operable to:
        (i) normally access the original factory service mode data in the working memory;

(ii) determine whether the original factory service mode data in the working memory has become corrupted;

(iii) responsive to the determination that the original factory service mode data in the working memory has not become corrupted, return to step (i);

(iv) responsive to the determination that the original factory service mode data in the working memory has become corrupted, read the original factory service mode data from the reserved memory and copy said original factory service mode data read from the reserve memory into the working memory; and (v) return to step (i); and (d) a control system operably coupled to the set microprocessor to actuate the set microprocessor to perform the specific access operation to access the reserved memory and copy the original factory service mode data from the reserved memory to the working memory when the original factory service mode data in the working memory is determined to be corrupted, wherein the original factory service mode data is only accessible by the set microprocessor on a read only basis upon execution of the specific access operation.

2. The apparatus as recited in claim 1, wherein the working memory and reserved memory are formed by partitioning a single memory device.

3. The apparatus as recited in claim 1, wherein the working memory and reserved memory are formed of separate memory devices.

4. The apparatus as recited in claim 1, wherein the working memory and reserved memory are formed of non-volatile memory.

5. The apparatus as recited in claim 1, wherein the working memory and reserved memory are each 32K.

6. The apparatus as recited in claim 1, wherein the set microprocessor normally communicates only with the working memory.

7. The apparatus as recited in claim 6, further comprising a user actuated control system communicating with the set microprocessor to actuate the set microprocessor to perform the specific access operation to access the reserved memory and copy the original factory service mode data to the working memory.

8. The apparatus as recited in claim 7, wherein the control system is located on the television set.

9. The apparatus as recited in claim 7, wherein the control system is located on a remote unit.

10. An apparatus for storing and retrieving original factory service mode data in a television set, comprising:

(a) a non-volatile working memory initially containing the original factory service mode data that is normally accessible by a user;

(b) a non-volatile reserved memory containing the same original factory service mode data that is normally not accessible to a user and is only accessible by a set microprocessor on a read only basis upon execution of a specific access operation so that the original factory service mode data is copied to the working memory to restore the working memory to its initial condition;

(c) the set microprocessor operably coupled to the working memory and the reserved memory, wherein the set microprocessor is operable to:

(i) normally access the original factory service mode data in the working memory;

(ii) determine whether the original factory service mode data in the working memory has become corrupted;

(iii) responsive to the determination that the original factory service mode data in the working memory has not become corrupted, return to step (i);

(iv) responsive to the determination that the original factory service mode data in the working memory has become corrupted, read the original factory service mode data from the reserved memory and copy said original factory service mode data read from the reserve memory into the working memory; and (v) return to step (i); and (d) a control system operably coupled to the set microprocessor to actuate the set microprocessor to perform the specific access operation to access the reserved memory and copy the original factory service mode data from the reserved memory to the working memory when the original factory service mode data in the working memory is determined to be corrupted, wherein the original factory service mode data is only accessible by the set microprocessor on a read only basis upon execution of the specific access operation.

11. The apparatus as recited in claim 10, wherein the working memory and reserved memory are formed by partitioning a single memory device or of separate memory devices.

12. The apparatus as recited in claim 10, wherein the control system is located on the television set or on a remote unit.

13. A method for storing and retrieving original factory service mode data in a television set, comprising:

providing in the television set, a working memory that is normally accessible to a user, and a reserved memory that is normally not accessible to a user;

initially inputting the original factory service mode data into both the working memory and the reserved memory;

allowing access to the working memory by the television set during normal operation;

evaluating data in the working memory to determine if the original factory service mode data has become corrupted; and responsive to the determination that the original factory service mode data has become corrupted, allowing special access to a set microprocessor on a read only basis, to the reserved memory upon execution of a specific access operation and copying the original factory service mode data in the reserved memory to the working memory to restore the working memory to an initial condition, wherein the execution of the specific access operation is actuated by actuation of a control system.

14. The method as recited in claim 13, wherein allowing special access to the reserved memory to copy the original factory service mode data to the working memory is repeated whenever necessary to restore the working memory to the initial condition.

15. The method as recited in claim 13, wherein the working memory and the reserved memory are formed by partitioning a single memory device or of separate memory devices.

16. The method as recited in claim 15, wherein the working memory and the reserved memory are formed of non-volatile memory.

* * * * *